(12) United States Patent
Shimizu

(10) Patent No.: US 11,172,089 B2
(45) Date of Patent: Nov. 9, 2021

(54) IMAGE READING APPARATUS AND IMAGE FORMING APPARATUS

(71) Applicant: CANON KABUSHIKI KAISHA, Tokyo (JP)

(72) Inventor: Hiromu Shimizu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/090,753

(22) Filed: Nov. 5, 2020

(65) Prior Publication Data
US 2021/0168254 A1  Jun. 3, 2021

(30) Foreign Application Priority Data

Nov. 29, 2019  (JP) .............................. JP2019-216501

(51) Int. Cl.
*H04N 1/04* (2006.01)
*H04N 1/00* (2006.01)

(52) U.S. Cl.
CPC ....... *H04N 1/00755* (2013.01); *H04N 1/0071* (2013.01); *H04N 1/00713* (2013.01)

(58) Field of Classification Search
CPC ............. H04N 1/00755; H04N 1/0071; H04N 1/00713; H04N 1/00708; H04N 1/0075
See application file for complete search history.

(56) References Cited

U.S. PATENT DOCUMENTS

| | | | |
|---|---|---|---|
| 7,471,424 B2 | 12/2008 | Ishido et al. | 358/449 |
| 8,134,753 B2 | 3/2012 | Ishido et al. | 358/449 |
| 10,356,269 B2 | 7/2019 | Shimizu | H04N 1/00816 |
| 10,616,428 B2 | 4/2020 | Shimizu | H04N 1/00708 |
| 10,764,461 B2 | 9/2020 | Shimizu | H04N 1/00687 |
| 2004/0165223 A1 | 8/2004 | Ishido et al. | 358/449 |
| 2009/0080031 A1 | 3/2009 | Ishido et al. | 358/449 |
| 2017/0034386 A1* | 2/2017 | Kusuhata | H04N 1/00734 |
| 2018/0176400 A1 | 6/2018 | Shimizu | H04N 1/00737 |
| 2018/0309894 A1 | 10/2018 | Shimizu | H04N 1/00687 |

FOREIGN PATENT DOCUMENTS

| | | |
|---|---|---|
| JP | 4012093 B | 11/2007 |
| JP | 2018-186381 | 11/2018 |

* cited by examiner

*Primary Examiner* — Moustapha Diaby
(74) *Attorney, Agent, or Firm* — Venable LLP

(57) ABSTRACT

An image reading apparatus including: an angle detector configured to detect a first state in which a pressure plate is at a first angle with respect to a transparent member and a second state in which the pressure plate is at a second angle smaller than the first angle; a size determiner configured to determine a size of the original in a main scanning direction based on a reading result of a reader; and a controller configured to switch a first size determination mode in which a light source is turned on when a waiting state in which an angle of the pressure plate is larger than the first angle is changed to the first state, and a second size determination mode in which the light source is tuned on when the first state is changed to the second state.

8 Claims, 9 Drawing Sheets

*FIG. 8*

412 — PLEASE SELECT ORIGINAL SIZE DETECTION METHOD

| GLARE AVOIDANCE PRIORITY MODE | ORIGINAL SIZE CONFIRMATION SPEED PRIORITY MODE |

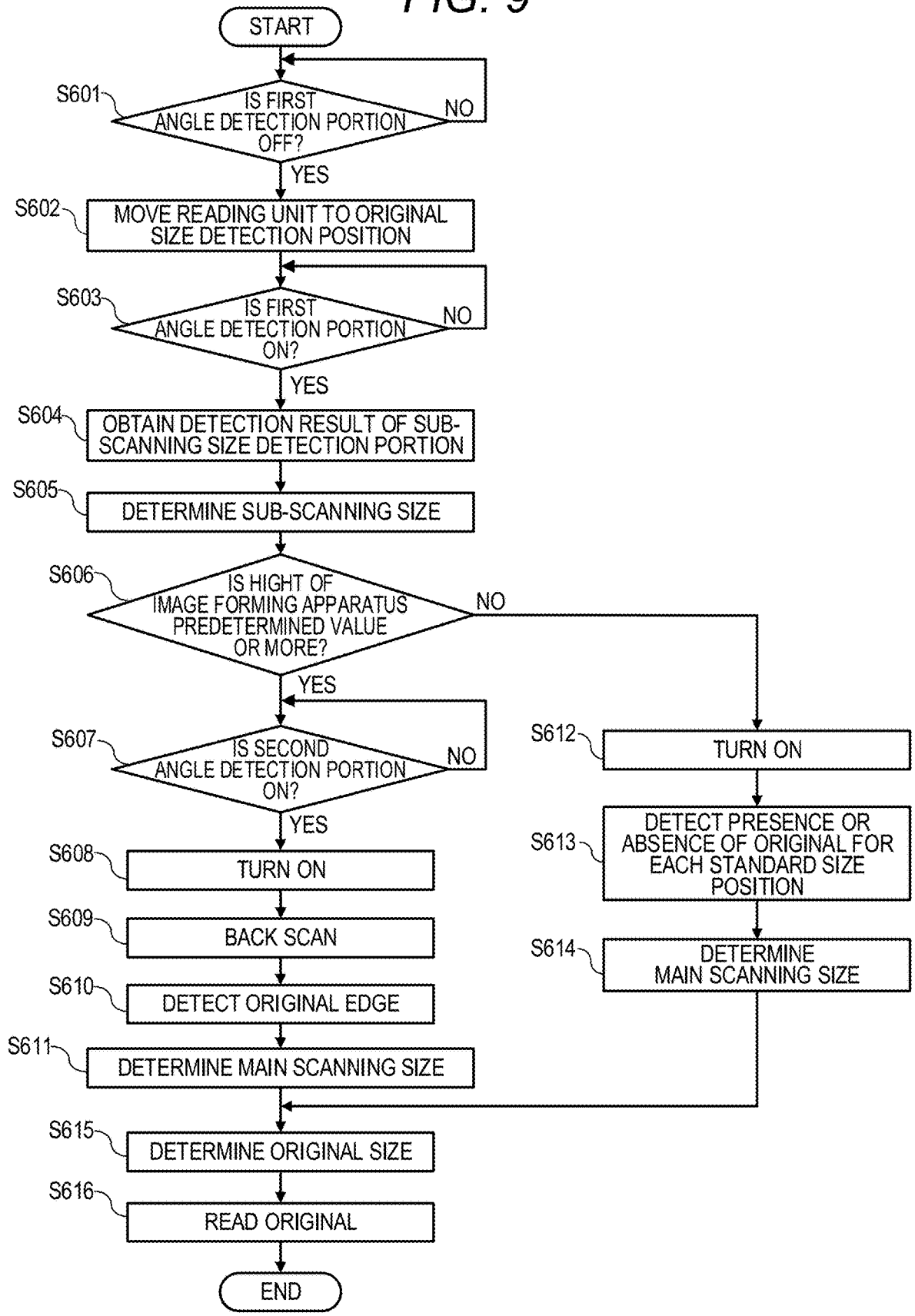

IMAGE READING APPARATUS AND IMAGE FORMING APPARATUS

BACKGROUND OF THE INVENTION

Field of the Invention

The present invention relates to an image reading apparatus configured to read an image of an original placed on a transparent member, and to an image forming apparatus including the image reading apparatus.

Description of the Related Art

Some of image reading apparatus configured to read an image of an original (hereinafter referred to as "original image") while moving a reading unit in a sub-scanning direction with respect to an original placed on an original base plate (transparent member) are configured to detect a size of the original based on the read original image. In Japanese Patent No. 4012093, there is disclosed an original size detecting apparatus configured to detect an original size in a main scanning direction based on the original image read by the reading unit, and to detect an original size in the sub-scanning direction based on a detection result of a sensor configured to detect presence or absence of the original on the original base plate. The original size detecting apparatus is configured to read the original image by irradiating the original with light under a state in which a pressure plate configured to press the original placed on the original base plate is opened at a predetermined angle with respect to the original base plate.

In Japanese Patent Application Laid-Open No. 2018-186381, there is disclosed an image reading apparatus configured to detect an original edge (original end portion) based on the original image read by the reading unit, to thereby detect the original size in the main scanning direction based on a position of the original edge. The image reading apparatus of Japanese Patent Application Laid-Open No. 2018-186381 is configured to detect the original size in the sub-scanning direction based on a detection result of a sensor configured to detect presence or absence of the original on the original base plate. The image reading apparatus is configured to detect the original edge by irradiating the original with light under a state in which a pressure plate configured to press the original placed on the original base plate is opened at a predetermined angle with respect to the original base plate, and reading the original image in the sub-scanning direction.

When the original size in the main scanning direction is to be detected, a brightness included in a reading result is compared with a predetermined threshold value to determine presence or absence of the original, and the original size is determined with reference to a position at which the presence or absence of the original is changed. In general, an original pressing member provided to an original pressing surface of the pressure plate has a white color, and an original also has a white color. Thus, when the original is read under a state in which the original is pressed by the pressure plate, it is difficult to distinguish the presence and absence of the original based on the brightness included in the reading result. In many cases, a reflection-type sensor is used as a sensor (original size sensor) to be used for detection of the original size in the sub-scanning direction. It is difficult for the reflection-type sensor to distinguish the presence and absence of the original because the original pressing member and the original have a small difference in amount of reflected light when the pressure plate is in a closed state. In view of the above, in Japanese Patent No. 4012093 and Japanese Patent Application Laid-Open No. 2018-186381, at the time of detecting the original size, the presence or absence of the original is detected with the pressure plate being in an open state. When a light source of the reading unit or the original size sensor is turned on with the pressure plate being in the open state, light emitted from the light source directly reaches eyes of a user. This light may cause the user to feel dazzled. In view of the above, in Japanese Patent No. 4012093 and Japanese Patent Application Laid-Open No. 2018-186381, in order to prevent the light emitted from the light source from directly reaching the eyes of the user, when the pressure plate is to be closed, the light source is turned on under a state in which the pressure plate is opened at an angle smaller than the predetermined angle with respect to the original base plate, to thereby detect the original size.

However, the predetermined angle of the pressure plate with respect to the original base plate to be set for preventing the light emitted from the light source from directly reaching the eyes of the user varies depending on the height of the image reading apparatus with respect to the height of the eyes of the user. Further, there are users who concern about glare of light of the light source at the time of detecting the original size, and users who rather place importance on time until the original size is confirmed.

SUMMARY OF THE INVENTION

In view of the above, the present invention provides an image reading apparatus capable of switching an angle of a pressure plate with respect to a transparent member to be set for starting illumination of a light source for original size detection.

In order to achieve the above-mentioned object, according to an embodiment, there is provided an image reading apparatus including: a reading unit including a transparent member on which an original is to be placed, a light source configured to radiate light and to move in a first direction, and a reading element configured to receive reflected light from the original illuminated with the light radiated from the light source; a pressure plate configured to turn with respect to the reading unit between a closing angle where a surface of the transparent member is covered by the pressure plate and an opening angle where the surface of the transparent member is exposed, wherein the pressure plate presses the original placed on the transparent member toward the transparent member in a state where an angle of the pressure plate with respect to the reading unit is the closing angle; an angle detector configured to detect a first state in which the angle of the pressure plate with respect to the reading unit is a first angle larger than the closing angle, and a second state in which the angle of the pressure plate with respect to the reading unit is a second angle smaller than the first angle and larger than the closing angle; and at least one processor performs the followings: to generate image data based on a receiving result of the reading element; to determine a size of the original in a second direction orthogonal to the first direction based on the image data; and to switch a first size determination mode and a second size determination mode, wherein, in the first size determination mode, the light source radiates the light to illuminate the original placed on the transparent member in a case where a first change is detected by the angle detector, the first change being a change of the angle of the pressure plate with respect to the reading unit from an angle larger than the first angle to the first angle, wherein, in the second size determination mode, the light source does not radiate the light in a case where the first change is detected by the angle detector and the light source radiates the light to illuminate the original placed on the transparent member in a case where a second change is detected by the angle detector, the second change being a change of the angle of the pressure plate with respect to the reading unit from the first state to the second state, wherein, in the first size determination mode, the at least one processor is configured to determine the size of the original in the second direction based on the image data corresponding to the light which the light source radiates based on a detection of the first change by the angle detector, and wherein, in the second size determination mode, the at least one processor is configured to determine the size of the original in the second direction based on the image data corresponding to the light which the light source radiates based on a detection of the second change by the angle detector.

Further features of the present invention will become apparent from the following description of exemplary embodiments with reference to the attached drawings.

BRIEF DESCRIPTION OF THE DRAWINGS

FIG. 8 is a view for illustrating an example of selection display of setting modes for an original size detection method at a console portion.

FIG. 9 is another flow chart for illustrating the original image reading processing including the original size detection processing.

DESCRIPTION OF THE EMBODIMENTS

Figure 1:
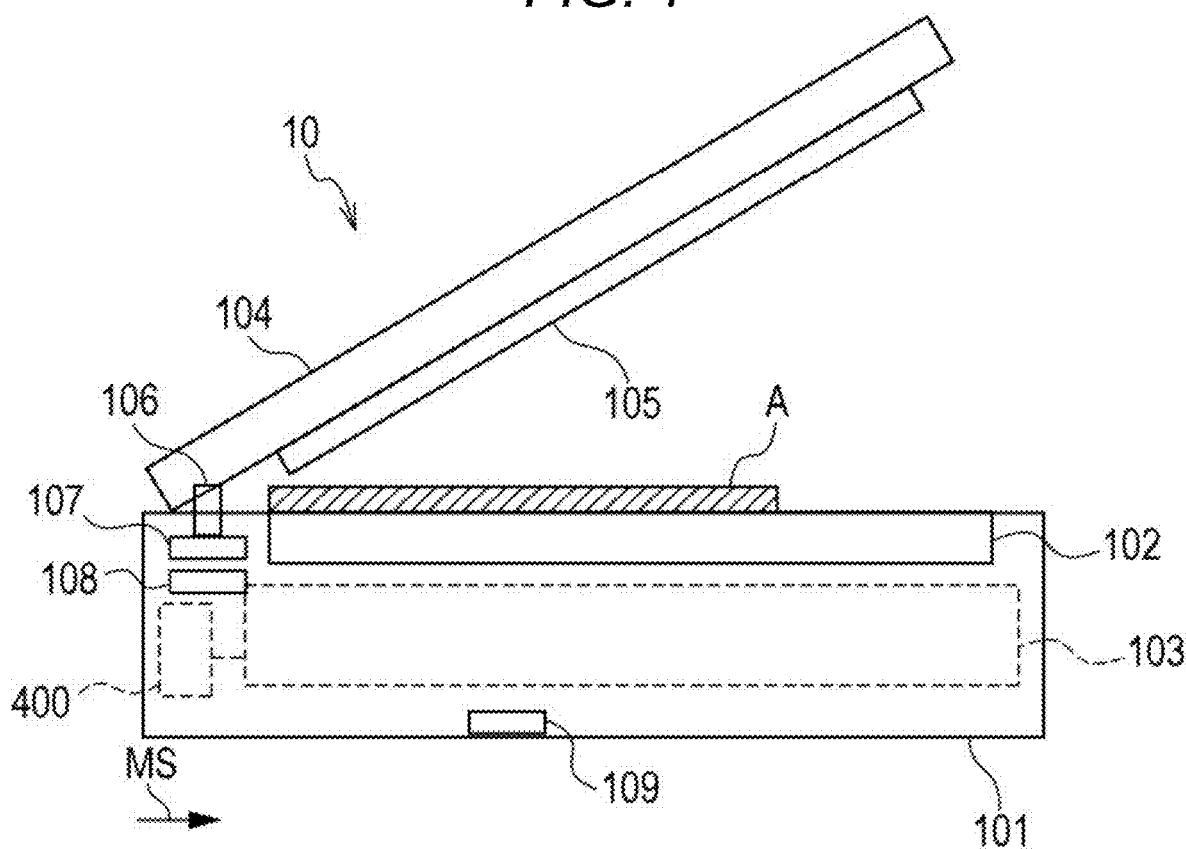
FIG. 1 is a side view of an image reading apparatus.
Figure 2:
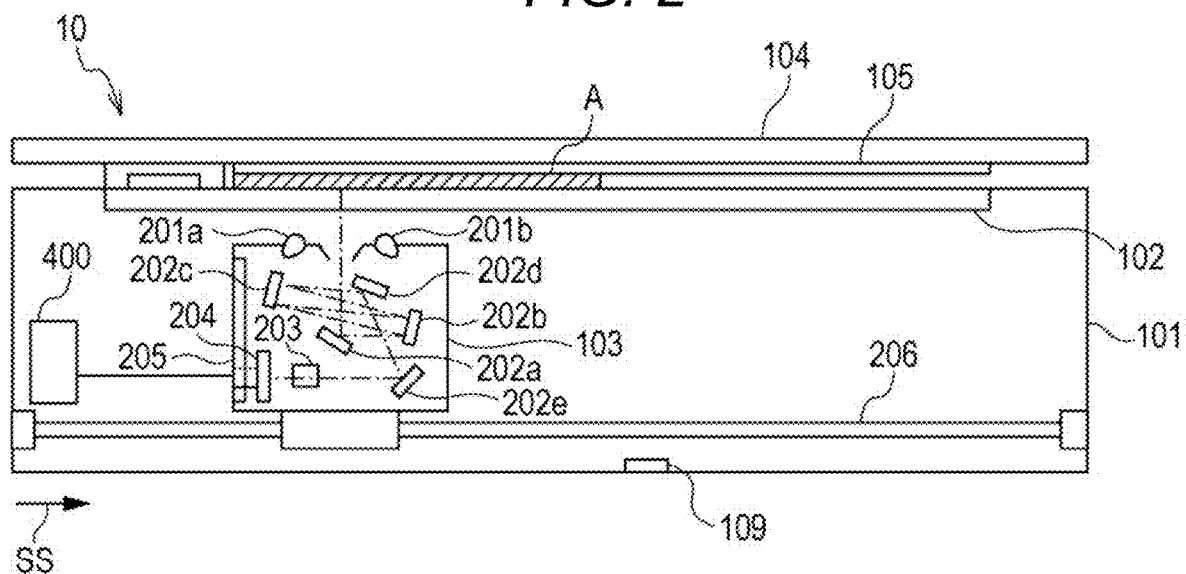
FIG. 2 is a sectional view of the image reading apparatus.

FIG. 1 is a side view of an image reading apparatus 10. FIG. 2 is a sectional view of the image reading apparatus 10. The image reading apparatus 10 includes a box-shaped casing 101, an original base plate (transparent member) 102, and a pressure plate 104. An original A to be read is placed on the original base plate 102. An original pressing member 105 configured to press the original A is mounted to the pressure plate 104. The original base plate 102 is formed of glass or other transparent members. The original A is placed so that a surface thereof to be read faces the original base plate 102 side. In order to prevent a region outside of a region of the original A from becoming black at the time of reading, the original pressing member 105 has a white surface on a side of pressing the original A. The pressure plate 104 can be mounted to the casing 101 at a variable angle, and is mounted to the casing 101 so as to be openable and closable with respect to the original base plate 102. The casing 101 accommodates a reading unit 103 configured to read an original image from the original A, a control unit 400, and a sub-scanning size detection portion 109.

The reading unit 103 includes illuminating units 201a and 201b, reflective mirrors 202a, 202b, 202c, 202d, and 202e, an imaging lens 203, a light receiving portion 204, and a sensor circuit board 205. The illuminating units 201a and 201b serving as an illuminator (light source) are configured to radiate light to the original A placed on the original base plate 102. The illuminating units 201a and 201b are each formed by linearly arranging, for example, a plurality of light emitting diodes (LEDs) or other light emitting elements. The light receiving portion 204 serving as a light receiver (reading element) is configured to receive reflected light obtained after the light radiated from the illuminating units 201a and 201b is reflected by the original. The reflective mirrors 202a to 202e form an optical system configured to guide the reflected light reflected by the original A to the imaging lens 203. The imaging lens 203 is configured to image the reflected light guided by the reflective mirrors 202a to 202e onto a light receiving surface of the light receiving portion 204.

The light receiving portion 204 is configured to output an electrical signal in accordance with the reflected light received by the light receiving surface. This electrical signal is an analog signal representing an original image read from the original A. The light receiving portion 204 is formed by arranging, for example, a plurality of charge coupled device (CCD) sensors or other photoelectric conversion elements in the same direction as the rows of the light emitting elements. The light receiving portion 204 is mounted on the sensor circuit board 205. The sensor circuit board 205 is connected to the control unit 400, and is configured to transmit the analog signal output from the light receiving portion 204 to the control unit 400. The configuration of the control unit 400 is described later.

The reading unit 103 serving as a reader is configured to read the original image with an arrangement direction of the light emitting element rows of the illuminating units 201a and 201b and the photoelectric conversion element row of the light receiving portion 204 being set as a main scanning direction MS. The reading unit 103 is movable along a rail 206. The moving direction of the reading unit 103 is a sub-scanning direction SS orthogonal to the main scanning direction MS. The reading unit 103 is configured to read the original image while moving on the rail 206 in the sub-scanning direction SS.

The sub-scanning size detection portion 109 is a reflection-type sensor, and is configured to detect presence or absence of the reflected light reflected by the original A placed on the original base plate 102. The presence and absence of the original A placed on the original base plate 102 can be distinguished based on a reflected light detection result of the sub-scanning size detection portion 109 serving as an original detector. The sub-scanning size detection portion 109 is arranged at a predetermined position in the sub-scanning direction SS, and is thus capable of detecting the size of the original A in the sub-scanning direction. The sub-scanning size detection portion 109 is configured to radiate invisible light, for example, infrared rays to the original A, to thereby distinguish the presence and absence of the original A based on the reflected light reflected by the original A. The user thus does not feel dazzled by the light radiated from the sub-scanning size detection portion 109 even when the pressure plate 104 is in an open state.

The casing 101 includes a pressure plate angle detection flag 106, a first angle detection portion 107, and a second angle detection portion 108 which are used to detect an open or closed state of the pressure plate 104 with respect to the original base plate 102. The first angle detection portion 107 and the second angle detection portion 108 function as an angle detector configured to detect a first state in which the pressure plate 104 forms a first angle with respect to the original base plate 102, and a second state in which the pressure plate 104 forms a second angle smaller than the first angle with respect to the original base plate 102. The position of the pressure plate angle detection flag 106 is changed in accordance with opening and closing of the pressure plate 104 so that the output of the first angle detection portion 107 and the output of the second angle detection portion 108 are changed. The first angle detection portion 107 is brought into an ON state when the angle of the pressure plate 104 with respect to the original base plate 102 is equal to or smaller than a predetermined first angle, and is brought into an OFF state when the angle of the pressure plate 104 with respect to the original base plate 102 is larger than the first angle. The second angle detection portion 108 is brought into an ON state when the angle of the pressure plate 104 with respect to the original base plate 102 is equal to or smaller than a predetermined second angle, and is brought into an OFF state when the angle of the pressure plate 104 with respect to the original base plate 102 is larger than the second angle. The first angle is set to an angle at which the sub-scanning size detection portion 109 being the reflection-type sensor does not erroneously detect the pressure plate 104 as an original, for example, 15°. The second angle is smaller than the first angle, and is set to an angle at which the light radiated by the reading unit 103 is less liable to reach the eyes of the user, for example, 0°.

The first angle may be other angles larger than 15°, for example, 20°. Further, the second angle may be an angle smaller than 15°, for example, 10° or 5°, as long as the light radiated by the reading unit 103 is less liable to reach eyes of a user having an expected body height.

Figure 3:
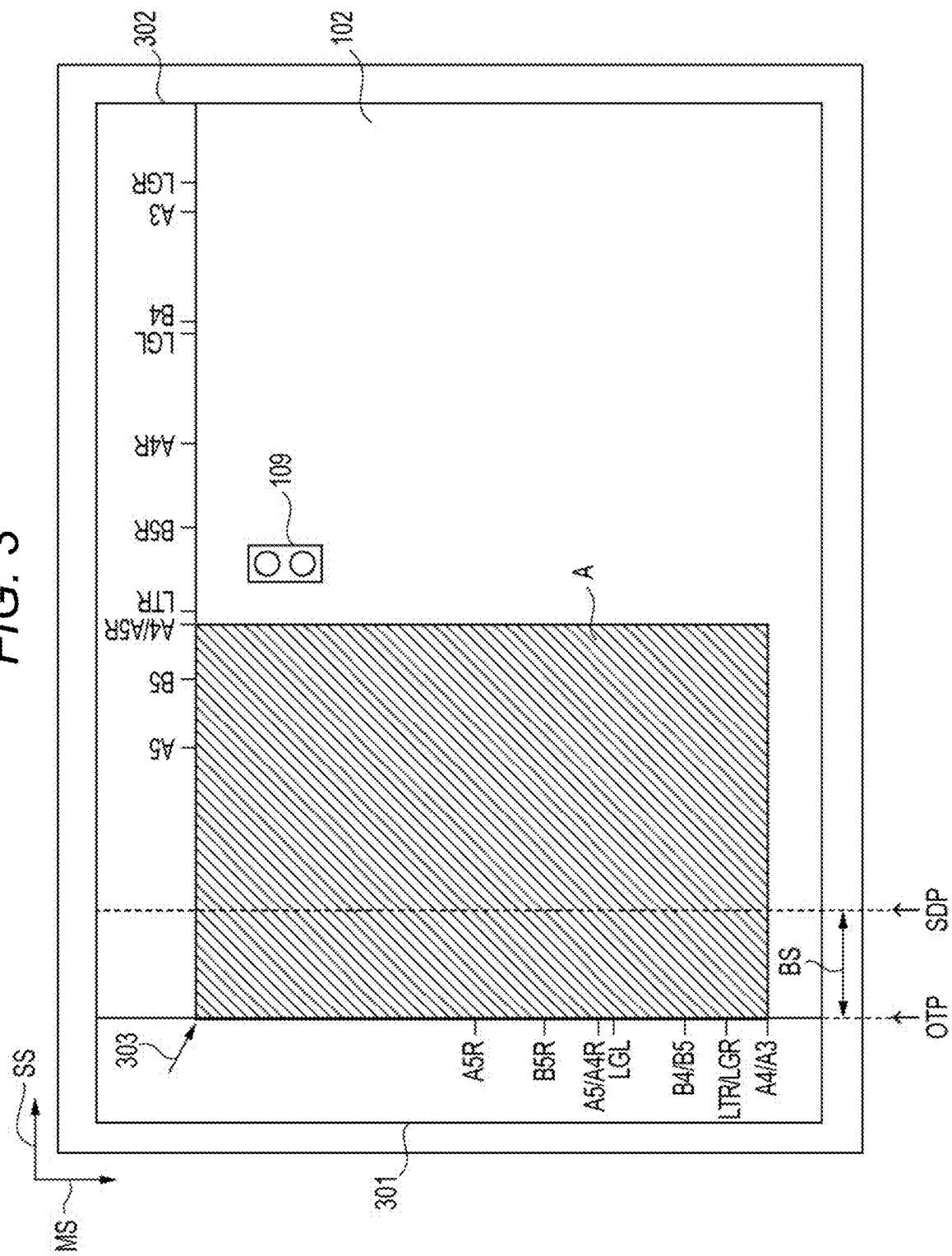
FIG. 3 is an explanatory view of an original base plate of a casing.

FIG. 3 is an explanatory view of the original base plate 102 of the casing 101. In the surroundings of the original base plate 102, a main scanning original size index 301, a sub-scanning original size index 302, and a reference position 303 are marked. The reference position 303 is used when the original A is placed. The original A is placed on the original base plate 102 so that a corner portion thereof matches the reference position 303. The main scanning original size index 301 is an index of a standard size in the main scanning direction MS for the original A placed so as to match the reference position 303. The sub-scanning original size index 302 is an index of a standard size in the sub-scanning direction SS for the original A placed so as to match the reference position 303. In the example of FIG. 3, an A4-sized original A is placed on the original base plate 102.

The size of the original A in the sub-scanning direction SS is detected through use of the sub-scanning size detection portion 109. The sub-scanning size detection portion 109 is provided between indices of two standard sizes in the sub-scanning direction SS to detect the presence or absence of the original A on the original base plate 102. The size of the original A in the sub-scanning direction SS is detected based on a detection result of the sub-scanning size detection portion 109. In the example of FIG. 3, the sub-scanning size detection portion 109 is provided between LTR and B5R being the indices of the two standard sizes. Based on the detection result of presence or absence of the original A by the sub-scanning size detection portion 109 provided at this position, the size of the original A in the sub-scanning direction SS can be distinguished between a size equal to or smaller than LTR and a size equal to or larger than BSR. That is, based on the detection result of the presence or absence of the original A by the sub-scanning size detection portion 109, it is determined whether the size of the original A in the sub-scanning direction SS is equal to or larger than the larger standard size or equal to or smaller than the smaller standard size. When the sub-scanning size detection portion 109 is provided at a different position, the size of the original in the sub-scanning direction SS can be distinguished in accordance with this position. Further, when a plurality of sub-scanning size detection portions 109 are arranged in the sub-scanning direction SS, further detailed detection of the original size in the sub-scanning direction SS is enabled.

The detection of the size of the original A in the main scanning direction MS is started from an original size detection position SDP. The reading of the original A is started from an original leading edge position OTP at the time of reading the original image. The original size detection position SDP is set at a position separated apart from the original leading edge position OTP by a predetermined distance (back-scan section BS) in the sub-scanning direction SS. The original leading edge position OTP is a position at which the original image is first read when the original A is read.

When the pressure plate 104 is opened, the control unit 400 can detect, based on the detection result of the first angle detection portion 107, whether or not the pressure plate 104 is brought into a waiting state in which the angle of the pressure plate 104 with respect to the original base plate 102 is larger than the first angle. When the first angle detection portion 107 is changed from the OFF state to the ON state due to the operation of closing the pressure plate 104, the control unit 400 moves the reading unit 103 to the original size detection position SDP so as to detect the size of the original A in the main scanning direction MS under a state in which the pressure plate 104 is opened. When a glare avoidance priority mode is set, after the reading unit 103 is moved to the original size detection position SDP, the control unit 400 determines whether or not the detection result of the second angle detection portion 108 is the ON state. When the second angle detection portion 108 is changed from the OFF state to the ON state due to the operation of closing the pressure plate 104, the control unit 400 reads the original A for a predetermined number of lines while moving the reading unit 103 from the original size detection position SDP to the original leading edge position OTP. An operation of reading the original A by the reading unit 103 in the back-scan section BS from the original size detection position SDP to the original leading edge position OTP is referred to as "back scan". The control unit 400 detects an original edge of the original A based on the reading result obtained by the reading unit 103, to thereby determine the size of the original in the main scanning direction MS based on the original edge.

Meanwhile, when an original size confirmation speed priority mode is set, after the first angle detection portion 107 is changed from the OFF state to the ON state and the reading unit 103 is moved to the original size detection position SDP, the control unit 400 turns on the illuminating units 201a and 201b. The control unit 400 causes the reading unit 103 to read the original A for one line corresponding to the original size detection position SDP. The control unit 400 detects an original presence/absence range of the original A based on the reading result obtained by the reading unit 103, to thereby determine the size of the original A in the main scanning direction MS based on the original presence/absence range.

Figure 4:
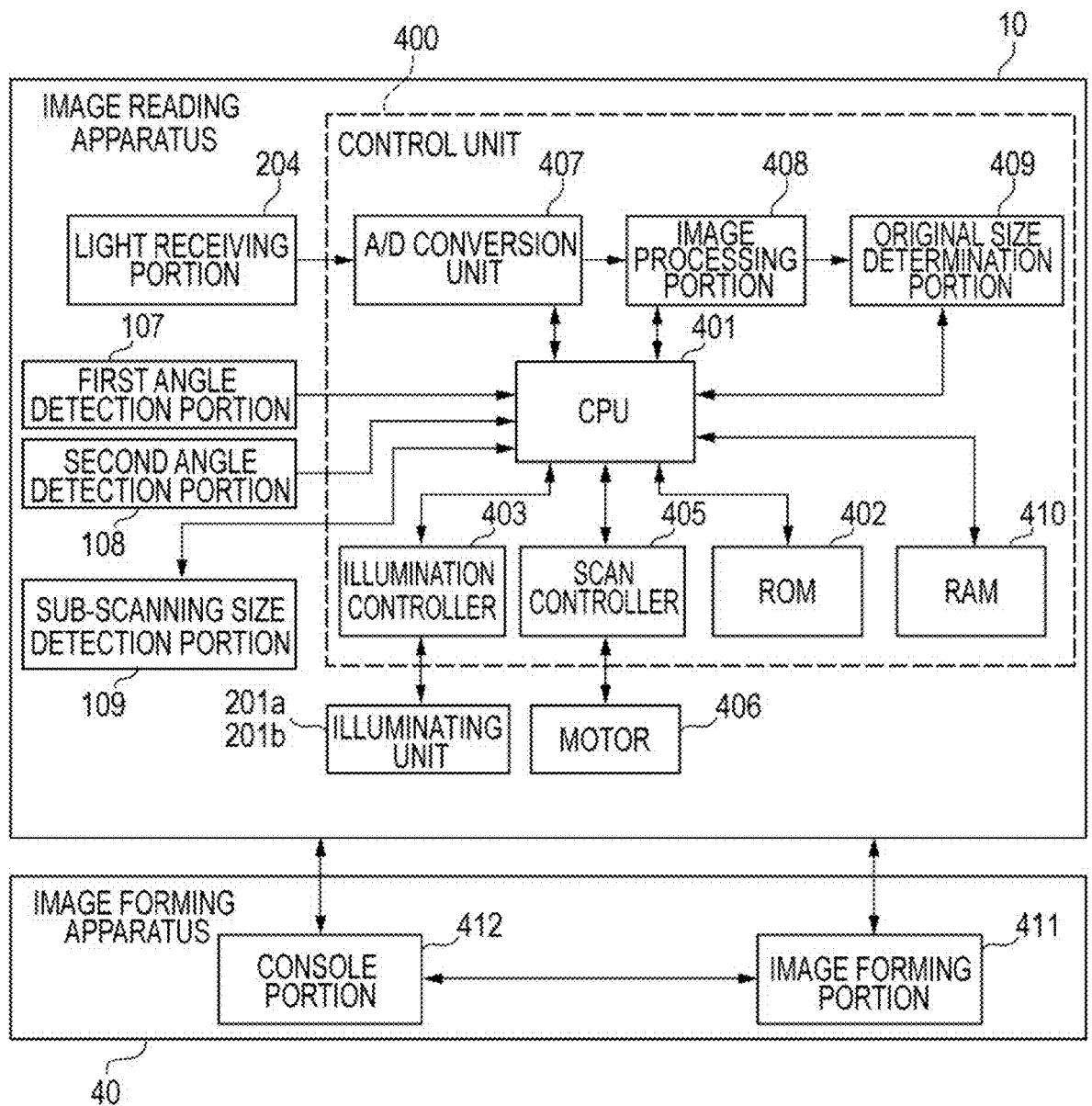
FIG. 4 is an explanatory diagram of a control unit.

FIG. 4 is an explanatory diagram of the control unit 400. The control unit 400 is electrically connected to the illuminating units 201a and 201b and the light receiving portion 204 of the reading unit 103. The control unit 400 is further electrically connected to the first angle detection portion 107, the second angle detection portion 108, the sub-scanning size detection portion 109, and a motor 406. The motor 406 is a drive source for moving the reading unit 103 along the rail 206. In FIG. 4, the image reading apparatus 10 is connected to an image forming apparatus 40 such as a copying machine, a printer, or a multifunctional peripheral.

The control unit 400 is a computer system including a central processing unit (CPU) 401, a read only memory (ROM) 402, and a random access memory (RAM) 410. The CPU 401 serving as a controller is configured to read out a computer program from the ROM 402 and execute the computer program through use of a work area of the RAM 410, to thereby control the operation of the image reading apparatus 10. The CPU 401 is configured to control the operation of the sub-scanning size detection portion 109 to acquire a detection result thereof. The control unit 400 further includes an illumination controller 403 and a scan controller 405 which are to be used for controlling the operation of the reading unit 103. The control unit 400 further includes an A/D conversion unit 407, an image processing portion 408, and an original size determination portion (original size determiner) 409 which are to be used for detecting the original size of the original A. The control unit 400 may be implemented by a discrete component or a one-chip semiconductor product. Examples of the one-chip semiconductor product include a micro-processing unit (MPU), an application specific integrated circuit (ASIC), and a system-on-a-chip (SOC).

The illumination controller 403 is controlled by the CPU 401 to control an operation of turning on and off the illuminating units 201a and 201b. In the original size confirmation speed priority mode, the illumination controller 403 turns on the illuminating units 201a and 201b based on the detection result of the first angle detection portion 107, and in the glare avoidance priority mode, the illumination controller 403 turns on the illuminating units 201a and 201b based on the detection result of the second angle detection portion 108. The scan controller 405 is controlled by the CPU 401 to transmit a drive signal to the motor 406, to thereby move the reading unit 103 along the rail 206 in the sub-scanning direction SS at a predetermined speed.

The A/D conversion unit 407 is controlled by the CPU 401 to receive, from the light receiving portion 204, an analog signal representing the original image to convert the analog signal into a digital signal, to thereby transmit the digital signal to the image processing portion 408. The image processing portion 408 is controlled by the CPU 401 to perform various types of image processing on the digital signal acquired from the A/D conversion unit 407, to thereby generate image data representing the original image read from the original A. The image data is transmitted from the control unit 400 to, for example, the image forming apparatus 40 or a personal computer.

The original size determination portion 409 serving as a main scanning size determiner is controlled by the CPU 401 to determine the size of the original A in the main scanning direction MS based on the image data generated by the image processing portion 408. The original size determination portion 409 is configured to acquire the detection result of the sub-scanning size detection portion 109 via the CPU 401, to thereby determine the size of the original A in the sub-scanning direction SS based on the acquired detection result. In the example of FIG. 3, when the detection result of the sub-scanning size detection portion 109 indicates that the original is present, the original size determination portion 409 determines that the size of the original A in the sub-scanning direction SS is equal to or larger than BSR. When the detection result of the sub-scanning size detection portion 109 indicates that the original is absent, the original size determination portion 409 determines that the size of the original A in the sub-scanning direction SS is equal to or smaller than LTR. The original size determination portion 409 is configured to determine the original size based on the size of the original A in the main scanning direction MS and the size of the original A in the sub-scanning direction SS.

The CPU 401 is configured to detect an angle of the pressure plate 104 based on the detection results of the first angle detection portion 107 and the second angle detection portion 108. The CPU 401 is configured to detect, by the original size determination portion 409, the original size of the original A through use of a fact that the detected angle of the pressure plate 104 has reached a predetermined angle as a trigger.

The image forming apparatus 40 includes an image forming portion 411 and a console portion (setting unit) 412. The image forming portion 411 is configured to form an image represented by the image data on a sheet or other recording materials based on the image data acquired from the control unit 400. The image forming portion 411 is configured to form an image on a recording material having a size corresponding to the original size determined by the control unit 400. In this manner, the original image read by the image reading apparatus 10 is formed on a recording material having an appropriate size. The console portion 412 is a user interface including an input device and an output device. Examples of the input device include various operation keys and a touch panel. Examples of the output device include a display. The console portion 412 is configured to provide information to the user through the output device, and to receive instructions from the user through the input device. The console portion 412 is configured to transmit the received instructions to the control unit 400 or the image forming portion 411. Further, the console portion 412 can switch an original size determination mode between the original size confirmation speed priority mode (first size determination mode) and the glare avoidance priority mode (second size determination mode). The console portion 412 may be provided in the image reading apparatus 10.

Figure 5:
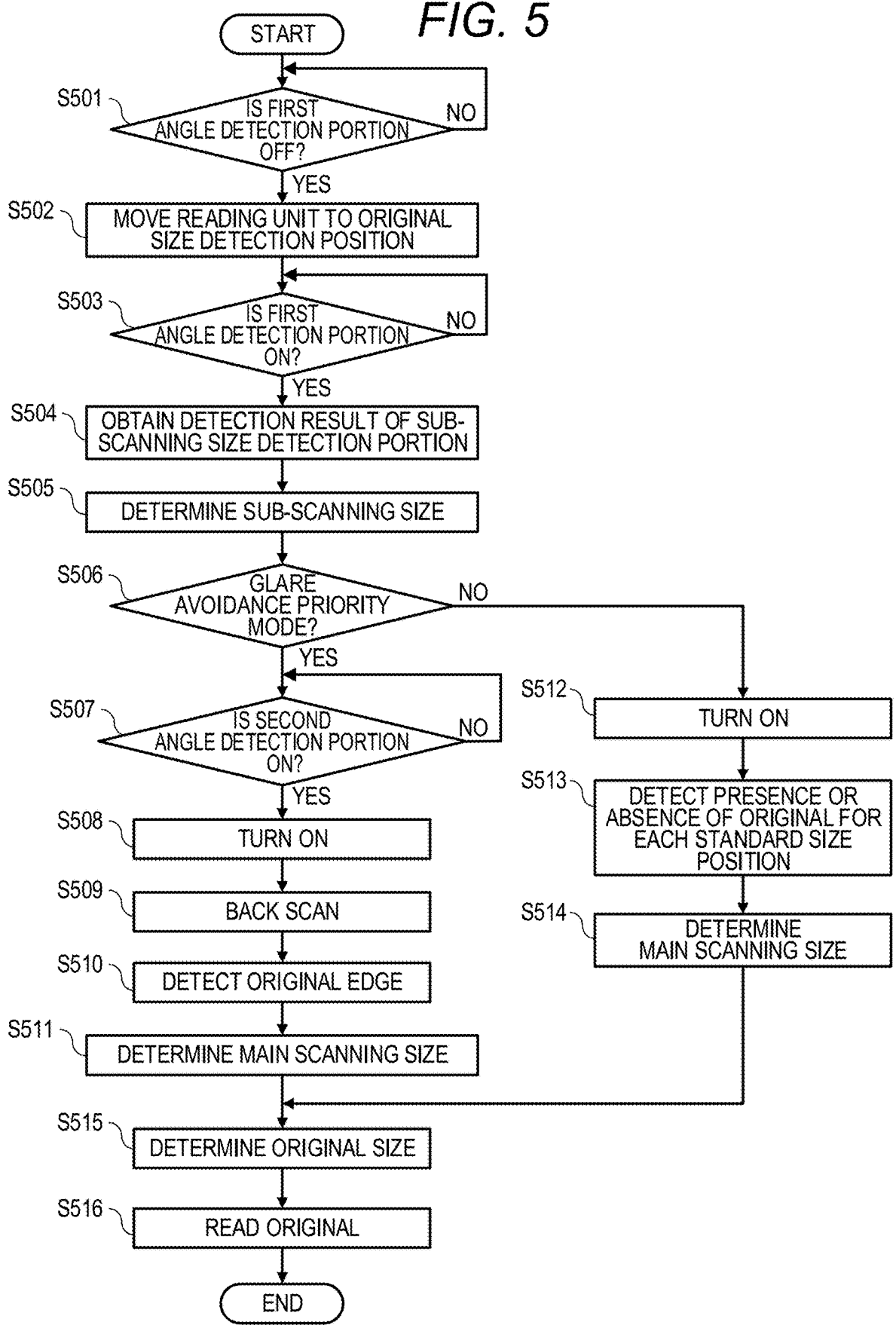
FIG. 5 is a flow chart for illustrating original image reading processing including original size detection processing.

FIG. 5 is a flow chart for illustrating original image reading processing including original size detection processing performed by the image reading apparatus 10. The control unit 400 determines whether or not the pressure plate 104 is opened from an angle equal to or smaller than the first angle to an angle larger than the first angle with respect to the original base plate 102, based on the change of the detection result acquired from the first angle detection portion 107 (Step S501). When the detection result of the first angle detection portion 107 is changed from the ON state to the OFF state, the control unit 400 determines that the pressure plate 104 is opened from an angle equal to or smaller than the first angle to an angle larger than the first angle with respect to the original base plate 102. When the pressure plate 104 is opened to an angle larger than the first angle with respect to the original base plate 102 (YES in Step S501), the control unit 400 moves the reading unit 103 to the original size detection position SDP (Step S502). At this time, the user places the original A on the original base plate 102 so that the corner portion thereof matches the reference position 303. After that, the control unit 400 determines whether or not the pressure plate 104 is closed from an angle larger than the first angle to an angle equal to or smaller than the first angle with respect to the original base plate 102, based on the change of the detection result acquired from the first angle detection portion 107 (Step S503). When the detection result of the first angle detection portion 107 is changed from the OFF state to the ON state, the control unit 400 determines that the pressure plate 104 is closed from an angle larger than the first angle to an angle equal to or smaller than the first angle with respect to the original base plate 102.

When the pressure plate 104 is closed to an angle equal to or smaller than the first angle (YES in Step S503), the control unit 400 acquires the detection result being the output of the sub-scanning size detection portion 109 (Step S504). The control unit 400 determines the size of the original A in the sub-scanning direction based on the detection result of the sub-scanning size detection portion 109 (Step S505). When the angle of the pressure plate 104 with respect to the original base plate 102 is the first angle, invisible light radiated from the sub-scanning size detection portion 109 does not reach the pressure plate 104. Thus, the sub-scanning size detection portion 109 does not erroneously detect the pressure plate 104 as the original A immediately after the pressure plate 104 is closed to an angle equal to or smaller than the first angle.

The control unit 400 determines whether or not the original size detection method (size determination mode) is set to the glare avoidance priority mode (Step S506). The original size detection method is switched between the glare avoidance priority mode and the original size confirmation speed priority mode by, for example, the user or a serviceman through the console portion 412.

When the original size detection method is set to the glare avoidance priority mode (YES in Step S506), the control unit 400 determines whether or not the pressure plate 104 is closed from an angle larger than the second angle to an angle equal to or smaller than the second angle with respect to the original base plate 102 (Step S507). This determination is made based on whether or not the detection result acquired from the second angle detection portion 108 is changed from the OFF state to the ON state. When the detection result of the second angle detection portion 108 is changed from the OFF state to the ON state, the control unit 400 determines that the pressure plate 104 is closed from an angle larger than the second angle to an angle equal to or smaller than the second angle with respect to the original base plate 102.

When the pressure plate 104 is closed to an angle equal to or smaller than the second angle (YES in Step S507), the control unit 400 turns on the illuminating units 201a and 201b of the reading unit 103 (Step S508), and moves the reading unit 103 from the original size detection position SDP to the original leading edge position OTP. In this manner, the control unit 400 performs back scan of reading the original A for a predetermined number of lines (Step S509). With the back scan, the control unit 400 acquires, from the reading unit 103, an analog signal representing the original image for a predetermined number of lines. The pressure plate 104 is closed to an angle equal to or smaller than the second angle, and hence the glare of light of the illuminating units 201a and 201b to be felt by the user is suppressed to the minimum.

The control unit 400 converts, by the A/D conversion unit 407, the analog signal representing the acquired original image into a digital signal. The control unit 400 subjects the digital signal to image processing by the image processing portion 408 to generate image data. The control unit 400 detects, by the original size determination portion 409, the original edge of the original A in the main scanning direction MS based on the image data (Step S510). The original edge detection processing is described in detail later. The control unit 400 determines the size of the original A in the main scanning direction MS based on the detected original edge (Step S511).

On the other hand, when the original size detection method is not set to the glare avoidance priority mode (NO in Step S506), the control unit 400 proceeds the processing to Step S512. In this embodiment, when the original size detection method is not set to the glare avoidance priority mode, the original size detection method is set to the original size confirmation speed priority mode. The control unit 400 turns on the illuminating units 201a and 201b of the reading unit 103 before the pressure plate 104 is closed to an angle equal to or smaller than the second angle, that is, under a state in which the pressure plate 104 is opened (Step S512).

The control unit 400 detects the presence or absence of the original A for each standard size position in the main scanning direction indicated by the main scanning original size index 301 (Step S513). The control unit 400 binarizes the brightness at the standard size position in the main scanning direction MS through comparison with a predetermined threshold value, based on a reading result for a predetermined number of lines obtained through one reading processing by turning on the illuminating units 201a and 201b. The original A generally has a white color, and thus has a large brightness. A part without the original A does not reflect the light of the illuminating units 201a and 201b because the pressure plate 104 is in the open state, and thus has a small brightness. The control unit 400 can thus determine that the original A is present in a part having a large brightness, and the original A is absent in a part having a small brightness. The control unit 400 determines a position at which the original presence is determined up to the standard size position based on the binarized brightness, to thereby determine the size of the original A in the main scanning direction MS (Step S514). In the original size confirmation speed priority mode, the illuminating units 201a and 201b are turned on under a state in which the pressure plate 104 is opened, and thus the size of the original A in the main scanning direction MS is determined. Thus, in the original size confirmation speed priority mode, the original size is confirmed by the time when the pressure plate 104 is closed by the user, and the time until the original size is confirmed is felt short.

The control unit 400 determines the original size of the original A based on the size of the original A in the sub-scanning direction SS determined in Step S505 and the size of the original A in the main scanning direction MS determined in Step S511 or Step S514 (Step S515). The control unit 400 that has determined the original size controls the operation of the reading unit 103 to read the original image of the original A placed on the original base plate 102 (Step S516). The user places the original A on the original base plate 102 and then operates the console portion 412, to thereby instruct the image reading apparatus 10 to read the original image. The console portion 412 transmits the instruction to read the original image to the control unit 400 in response to the operation performed by the user. The control unit 400 acquires the instruction to read the original image from the console portion 412 to start reading the original image.

With the above-mentioned processing, the original size of the original A placed on the original base plate 102 is determined, and the original image is read. The image data representing the read original image is transmitted to, for example, the image forming apparatus 40 so as to be used by the image forming portion 411 for the processing of forming an image on the recording material.

According to this embodiment, the angle of the pressure plate with respect to the original base plate to be set for starting illumination of the illuminating units 201a and 201b for original size detection can be switched based on the mode set for the original size detection.

Figure 6:
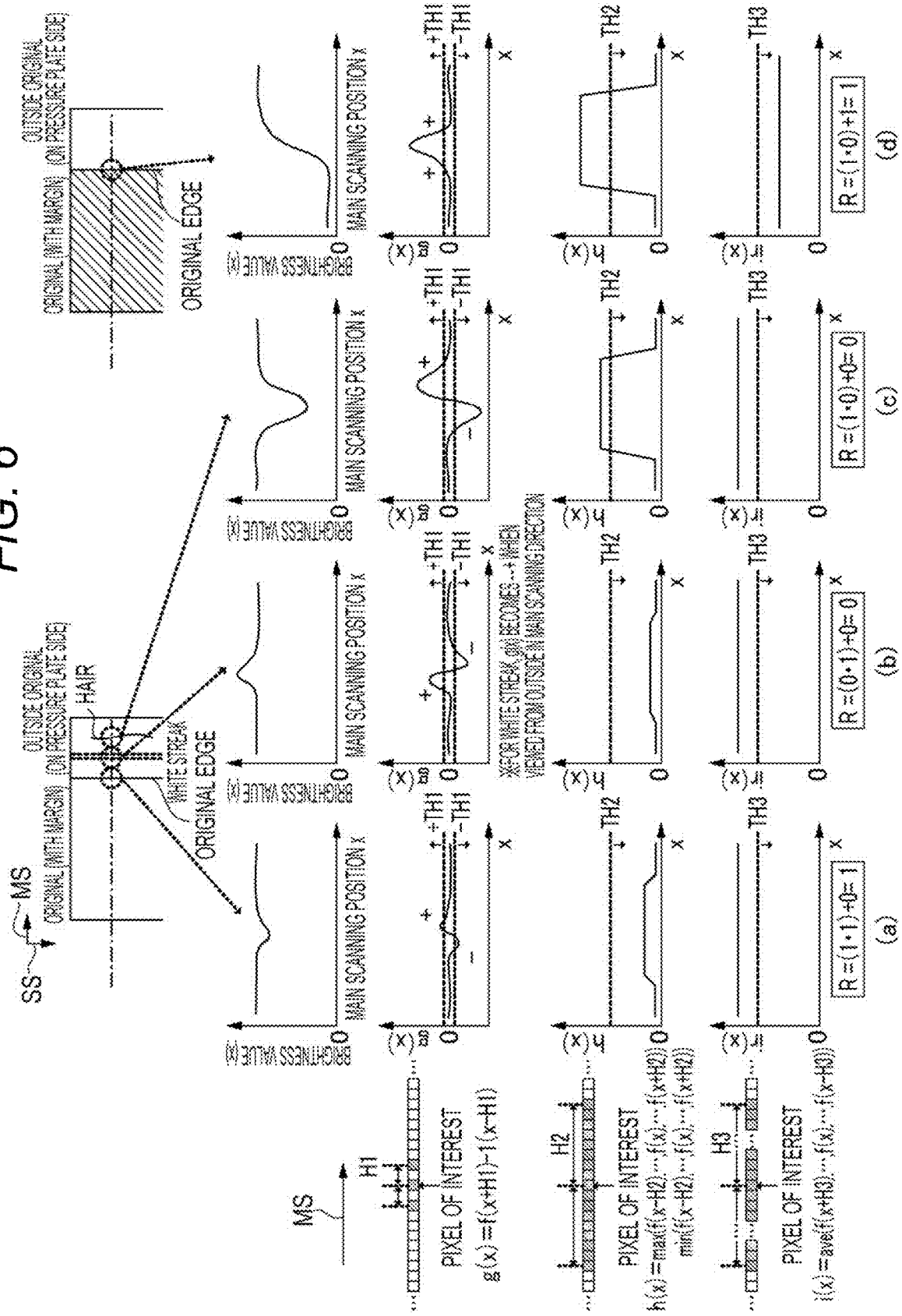
FIG. 6 is an explanatory diagram of original edge detection processing.
Figure 7:
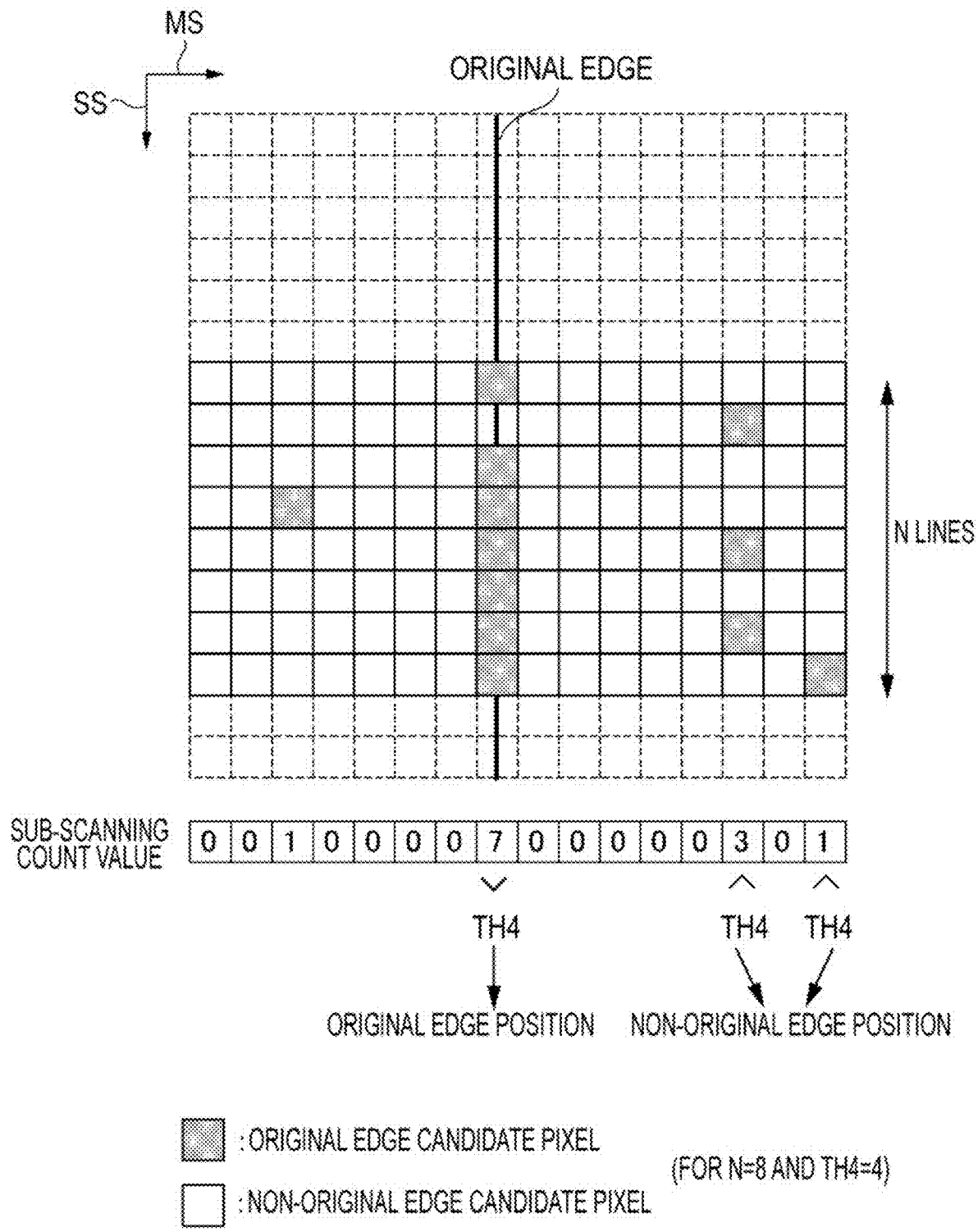
FIG. 7 is an explanatory diagram of the original edge detection processing.

FIG. 6 and FIG. 7 are explanatory diagrams of the original edge detection processing of Step S510. The original size determination portion 409 of the control unit 400 determines, for each pixel of the original image, whether or not the pixel corresponds to the original edge, to thereby detect the position of the original edge. The control unit 400 detects the original edge at high accuracy as described below even when dust, hair, or other dirt adheres to the original pressing member 105.

The original size determination portion 409 uses three determination expressions to determine whether or not a pixel of interest being a determination target of the original edge is a pixel of the original edge (original edge pixel). A position of the pixel of interest in the main scanning direction MS is represented by "x", and a brightness value of the pixel of interest is represented by "f(x)". The brightness value of each pixel is included in the image data. The first determination expression expresses a brightness difference value g(x) being a difference value between brightness values f(x+H1) and f(x−H1) of pixels at two positions (x+H1) and (x−H1) each separated from the pixel of interest by a predetermined first distance H1 in the main scanning direction MS.

$$g(x)=f(x+H1)-f(x-H1)$$

The second determination expression expresses a difference value h(x) between the maximum brightness value and the minimum brightness value of pixels within a range of a predetermined second distance H2 larger than the first distance H1 from the pixel of interest in the main scanning direction MS.

$$h(x)=\max(f(x-H2), f(x), \ldots f(x+H2))-\min(f(x-H2), \ldots, f(x), \ldots f(x+H2))$$

The third determination expression expresses an average value i(x) of brightness values of pixels within a range of a predetermined third distance H3 from the pixel of interest in the main scanning direction MS.

$$i(x)=ave(f(x+H3), \ldots, f(x), \ldots f(x-H3))$$

The original size determination portion 409 compares results of the calculation using the first to third determination expressions with first to third threshold values, respectively, to determine whether or not the pixel of interest is the original edge pixel.

The light emitting elements of the illuminating units 201a and 201b obliquely irradiate the original A with light. A shadow is thus generated at the original edge due to the thickness of the original A. This shadow causes a brightness difference between the original edge and the original pressing member 105. The brightness difference value g(x) is calculated to detect this brightness difference. A first threshold value TH1 is set to a value that allows distinction between the brightness value caused by the original edge and the brightness value caused by the original pressing member 105 serving as a background. At the original edge, an absolute value of the brightness difference value g(x) is larger than the first threshold value TH1, and in a non-original edge part of the original pressing member 105, an absolute value of the brightness difference value g(x) is smaller than the first threshold value TH1. The first threshold value TH1 is set in consideration of an original causing less shade and having a small basis weight.

The original size determination portion 409 can distinguish a white streak based on a change in sign of the brightness difference value g(x). The shadow of the original edge has a brightness lower than those of surrounding pixels, and hence the sign of the brightness difference value g(x) changes from positive to negative when viewed from the outside in the main scanning direction MS. The white streak has a brightness higher than those of surrounding pixels, and hence the sign of the brightness difference value g(x) changes from negative to positive when viewed from the outside in the main scanning direction MS. The original size determination portion 409 distinguishes the white streak based on this change in sign. As described above, the brightness difference value g(x) can be used to distinguish the original edge from the original pressing member 105 or the white streak. However, the brightness difference value g(x) is increased also when dust, hair, or other dirt is read. It is thus difficult for the original size determination portion 409 to distinguish, based on the brightness difference value g(x), the original edge from a pixel given when the dirt is read.

The original size determination portion 409 compares the difference value h(x) with a second threshold value TH2 to distinguish the original edge from the pixel given when dirt is read. A shadow caused by the original edge and a shadow caused by the dirt often have a difference in brightness features. The shadow caused by the original edge is blurred due to the influence of diffused light of the illuminating units 201a and 201b. The dirt itself is often dark, and the shadow caused by the dirt is sharper than the shadow caused by the original edge. Thus, the brightness value of the shadow caused by the dirt is lower than the brightness value of the shadow caused by the original edge. That is, the difference value h(x) of a range including the shadow caused by the original edge is smaller than the difference value h(x) of a range including the shadow caused by the dirt. Thus, the cause of the shadow can be determined by distinguishing the difference values h(x) through use of an appropriate second threshold value TH2. The second threshold value TH2 is set to such a value. However, through use of the brightness difference value g(x) and the difference value h(x), the original size determination portion 409 may erroneously detect an original edge of a black original without a margin as dust, hair, or other dirt.

The original size determination portion 409 compares the average value i(x) with a third threshold value TH3 to distinguish, through use of the average value i(x), the original edge of the black original without a margin from a pixel given when dirt is read. When the original A is a black original without a margin, at the vicinity of the original edge, the average value i(x) of the brightness values of the pixels within the predetermined range in the main scanning direction MS becomes smaller than the average value i(x) obtained when the brightness value caused by dirt is included. This is because the average value i(x) includes a large number of brightness values of the original edge of the black original. Dirt is often a small dot or has a streak shape. When the brightness values are averaged in a range that is large to some extent, the influence of the dirt is reduced, and the average value i(x) includes a large number of brightness values caused by the white color of the original pressing member 105. Thus, when the brightness value caused by dirt is included, the average value i(x) is increased. When such average values i(x) are distinguished through use of an appropriate third threshold value TH3, the cause of the shadow can be determined. The third threshold value TH3 is set to such a value.

The original size determination portion 409 combines the determinations using the brightness difference value g(x), the difference value h(x), and the average value i(x) to accurately perform distinction of whether or not the pixel of interest is the original edge pixel. Further, as illustrated in FIG. 7, the original size determination portion 409 counts the number of original edge pixels for a plurality of lines in the sub-scanning direction SS, thereby being capable of suppressing the influence of noise or other factors to increase the detection accuracy of the original edge. When there are a plurality of original edge positions detected through the original edge detection, the original size determination portion 409 sets the outermost position as the original edge position. This setting reduces the possibility of erroneously detecting a figure or a ruled line in the original A as the original edge.

In FIG. 7, the original edge is detected based on a count value of original edge candidate pixels. The original edge candidate pixels are determined in the main scanning direction MS. The determination is repeated for N lines to allow determination on whether or not the pixels at the same position in the main scanning direction MS are original edge candidate pixels and a predetermined number or more of original edge candidate pixels are present in the sub-scanning direction SS. This predetermined number corresponds to a fourth threshold value TH4. In the example of FIG. 7, there are seven original edge candidate pixels in the eighth pixel row from the left end in the main scanning direction MS. It is thus determined that the eighth pixel row from the left end in the main scanning direction MS is the original edge. There are original edge candidate pixels in the third pixel row, the fourteenth pixel row, and the sixteenth pixel row from the left end in the main scanning direction MS, but the number of original edge candidate pixels is smaller than the predetermined number (fourth threshold value TH4), and hence the pixel rows are not determined as the original edge. As described above, even when there is dirt that may cause erroneous detection in one-line processing, the original edge can be detected at high accuracy with the influence of the dirt being suppressed.

FIG. 8 is a view for illustrating an example of selection display of setting modes for the original size detection method at the console portion 412. In this embodiment, the setting modes for the original size detection method include the glare avoidance priority mode and the original size confirmation speed priority mode. The setting modes for the original size detection method are not limited to a case in which the setting modes are set based on an instruction from the console portion 412. For example, the setting modes for the original size detection method may be automatically switched for each user.

FIG. 9 is another flow chart for illustrating the original image reading processing including the original size detection processing performed by the image reading apparatus 10. Processing of from Step S601 to Step S605 and processing of from Step S607 to Step S616 are similar to the processing of from Step S501 to Step S505 and the processing of from Step S507 to Step S516 of FIG. 5, and hence description thereof is omitted here.

The control unit 400 determines whether or not the height of the image forming apparatus 40 having the image reading apparatus 10 mounted thereon is equal to or larger than a predetermined value (Step S606). When the height of the image forming apparatus 40 is equal to or larger than the predetermined value (YES in Step S606), the control unit 400 executes the processing (Step S607 to Step S611) in the glare avoidance priority mode (second size determination mode) for reducing the glare. When the height of the image forming apparatus 40 is smaller than the predetermined value (NO in Step S606), the control unit 400 executes the processing (Step S612 to Step S614) in the original size confirmation speed priority mode (first size determination mode) for reducing the time until the original size is confirmed. The processing of from Step S612 to Step S614 is similar to the processing of from Step S512 to Step S514 of FIG. 5, and hence description thereof is omitted here.

Figure 10A:
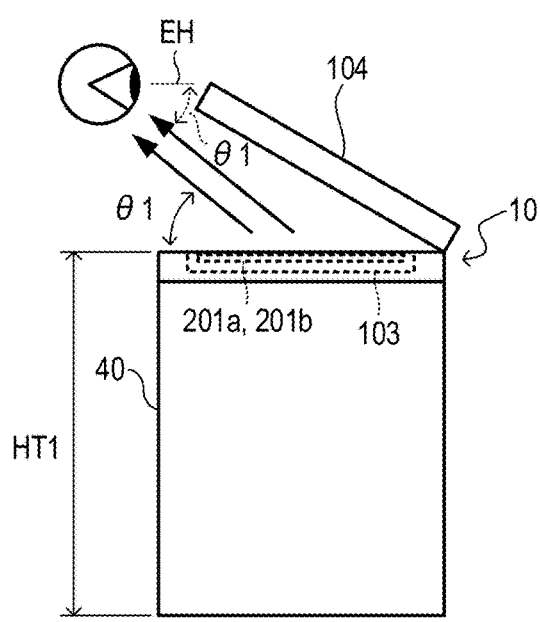
FIG. 10A and FIG. 10B are explanatory views for illustrating a difference in irradiation angle of a light source depending on a height of an image forming apparatus.
Figure 10B:
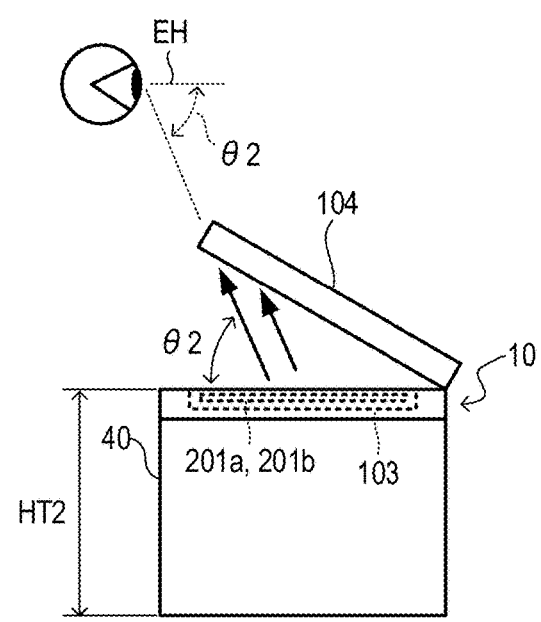

FIG. 10A and FIG. 10B are explanatory views for illustrating a difference in irradiation angle of a light source depending on the height of the image forming apparatus 40. As illustrated in FIG. 10A, when a height HT1 of the image forming apparatus 40 is high, an angle θ1 formed between an eye level EH of the user and the light of the illuminating units 201a and 201b of the reading unit 103 is small, and hence the light of the illuminating units 201a and 201b is less liable to be blocked by the pressure plate 104. Thus, the light of the illuminating units 201a and 201b is liable to reach the eyes of the user, and the user may feel dazzled. It is thus desired to use a mode for reducing glare at the time of original size detection when the height HT1 of the image forming apparatus 40 is high. In the example illustrated in FIG. 9, when the height HT1 of the image forming apparatus 40 is equal to or larger than the predetermined value (YES in Step S606), the control unit 400 performs processing (Step S607 to Step S611) similar to the processing (Step S507 to Step S511) in the glare avoidance priority mode of FIG. 5.

Meanwhile, as illustrated in FIG. 10B, when a height HT2 of the image forming apparatus 40 is low, an angle θ2 formed between the eye level EH of the user and the light of the illuminating units 201a and 201b of the reading unit 103 is large, and hence the light of the illuminating units 201a and 201b is more liable to be blocked by the pressure plate 104. Thus, the light of the illuminating units 201a and 201b is less liable to reach the eyes of the user, and the user may rarely feel dazzled. It is thus desired to use a mode in which the time until the original size is confirmed is short when the height HT2 of the image forming apparatus 40 is low. In the example illustrated in FIG. 9, when the height HT2 of the image forming apparatus 40 is smaller than the predetermined value (NO in Step S606), the control unit 400 performs processing (Step S612 to Step S614) similar to the processing (Step S512 to Step S514) in the original size confirmation speed priority mode of FIG. 5. The heights HT1 and HT2 of the image forming apparatus 40 are distinguished based on, for example, the number of installed cassette pedestals. The cassette pedestal is a feeder provided in a lower portion of the image forming apparatus 40 and configured to store the recording material to feed the recording material to the image forming portion 411.

According to this embodiment, the angle of the pressure plate with respect to the original base plate to be set for starting illumination of the illuminating units 201a and 201b for original size detection can be switched based on the height of the image forming apparatus 40.

According to this embodiment, the original size confirmation speed priority mode and the glare avoidance priority mode can be switched based on the detection results of the first angle detection portion 107 and the second angle detection portion 108.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-216501, filed Nov. 29, 2019, which is hereby incorporated by reference herein in its entirety.

What is claimed is:

1. An image reading apparatus, comprising:
   a reading unit including a transparent member on which an original is to be placed, a light source configured to radiate light and to move in a first direction, and a reading element configured to receive reflected light from the original illuminated with the light radiated from the light source;
   a pressure plate configured to turn with respect to the reading unit between a closing angle where a surface of the transparent member is covered by the pressure plate and an opening angle where the surface of the transparent member is exposed, wherein the pressure plate presses the original placed on the transparent member toward the transparent member in a state where an angle of the pressure plate with respect to the reading unit is the closing angle;
   an angle detector configured to detect a first state in which the angle of the pressure plate with respect to the reading unit is a first angle larger than the closing angle, and a second state in which the angle of the pressure plate with respect to the reading unit is a second angle smaller than the first angle and larger than the closing angle; and
   at least one processor performs the followings:
      to generate image data based on a receiving result of the reading element;
      to determine a size of the original in a second direction orthogonal to the first direction based on the image data; and
      to switch a first size determination mode and a second size determination mode,
   wherein, in the first size determination mode, the light source radiates the light to illuminate the original placed on the transparent member in a case where a first change is detected by the angle detector, the first change being a change of the angle of the pressure plate with respect to the reading unit from an angle larger than the first angle to the first angle,
   wherein, in the second size determination mode, the light source does not radiate the light in a case where the first change is detected by the angle detector and the light source radiates the light to illuminate the original placed on the transparent member in a case where a second change is detected by the angle detector, the second change being a change of the angle of the pressure plate with respect to the reading unit from the first state to the second state,
   wherein, in the first size determination mode, the at least one processor is configured to determine the size of the original in the second direction based on the image data corresponding to the light which the light source radiates based on a detection of the first change by the angle detector, and
   wherein, in the second size determination mode, the at least one processor is configured to determine the size of the original in the second direction based on the image data corresponding to the light which the light source radiates based on a detection of the second change by the angle detector.

2. The image reading apparatus according to claim 1, further comprising a setting unit configured to set a size determination mode to the first size determination mode or the second size determination mode,
   wherein the at least one processor switches the first size determination mode and the second size determination mode based on the size determination mode set by the setting unit.

3. The image reading apparatus according to claim 1, further comprising an original detector configured to detect presence or absence of the original placed on the transparent member,
   wherein the at least one processor determines a size of the original in the first direction based on a detection result of the original detector.

4. The image reading apparatus according to claim 3, wherein the original detector radiates invisible light.

5. An image forming apparatus, comprising:
   an image reading apparatus; and
   an image forming portion configured to form, on a recording material, an image of an original read by the image reading apparatus,
   wherein the image reading apparatus comprises:
      a reading unit including a transparent member on which an original is to be placed, a light source configured to radiate light and to move in a first direction, and a reading element configured to receive reflected light from the original illuminated with the light radiated from the light source;
      a pressure plate configured to turn with respect to the reading unit between a closing angle where a surface of the transparent member is covered by the pressure plate and an opening angle where the surface of the transparent member is exposed, wherein the pressure plate presses the original placed on the transparent member toward the transparent member in a state where an angle of the pressure plate with respect to the reading unit is the closing angle;
      an angle detector configured to detect a first state in which the angle of the pressure plate with respect to the reading unit is a first angle larger than the closing angle, and a second state in which the angle of the pressure plate with respect to the reading unit is a second angle smaller than the first angle and larger than the closing angle; and
      at least one processor performs the followings:
         to generate image data based on a receiving result of the reading element;
         to determine a size of the original in a second direction orthogonal to the first direction based on the image data; and
         to switch a first size determination mode and a second size determination mode,
      wherein, in the first size determination mode, the light source radiates the light to illuminate the original placed on the transparent member in a case where a first change is detected by the angle detector, the first change being a change of the angle of the pressure plate with respect to the reading unit from an angle larger than the first angle to the first angle, wherein, in the second size determination mode, the light source does not radiate the light in a case where the first change is detected by the angle detector and the light source radiates the light to illuminate the original placed on the transparent member in a case where a second change is detected by the angle detector, the second change being a change of the angle of the pressure plate with respect to the reading unit from the first state to the second state, wherein, in the first size determination mode, the at least one processor is configured to determine the size of the original in the second direction based on the image data corresponding to the light which the light source radiates based on a detection of the first change by the angle detector, and wherein, in the second size determination mode, the at least one processor is configured to determine the size of the original in the second direction based on the image data corresponding to the light which the light source radiates based on a detection of the second change by the angle detector.

6. The image forming apparatus according to claim 5, wherein the image reading apparatus further comprises a setting unit configured to set a size determination mode to the first size determination mode or the second size determination mode, and wherein the at least one processor switches the first size determination mode and the second size determination mode based on the size determination mode set by the setting unit.

7. The image forming apparatus according to claim 5, wherein the image reading apparatus further comprises an original detector configured to detect presence or absence of the original placed on the transparent member, and wherein the at least one processor determines a size of the original in the first direction based on a detection result of the original detector.

8. The image forming apparatus according to claim 7, wherein the original detector radiates invisible light.

* * * * *